(12) United States Patent
Nijsen

(10) Patent No.: US 8,091,932 B2
(45) Date of Patent: Jan. 10, 2012

(54) COUPLING DEVICE AND METHOD FOR MANUFACTURING A GRIP RING TO BE USED IN SUCH A COUPLING DEVICE

(75) Inventor: Andreas Jacobus Louis Nijsen, Enschede (NL)

(73) Assignee: Georg Fischer WAGA N.V., Epe (NL)

( * ) Notice: Subject to any disclaimer, the term of this patent is extended or adjusted under 35 U.S.C. 154(b) by 0 days.

(21) Appl. No.: 12/977,892

(22) Filed: Dec. 23, 2010

(65) Prior Publication Data
US 2011/0148105 A1 Jun. 23, 2011

Related U.S. Application Data

(63) Continuation of application No. PCT/NL2009/050338, filed on Jun. 15, 2009.

(51) Int. Cl.
*F16L 19/06* (2006.01)
(52) U.S. Cl. ........ 285/421; 285/341; 285/340; 285/323; 285/332.2; 285/104; 29/557
(58) Field of Classification Search .................. 285/342, 285/343, 339, 341, 340, 323, 332.1, 332.2, 285/421, 104; 29/557
See application file for complete search history.

(56) References Cited

U.S. PATENT DOCUMENTS

| | | | | |
|---|---|---|---|---|
| 2,147,353 A | * | 2/1939 | Scholtes | ........................ 285/340 |
| 4,586,734 A | | 5/1986 | Grenier | |
| 4,664,422 A | * | 5/1987 | Straub | ........................... 285/340 |
| 5,039,141 A | | 8/1991 | Badoureaux | |
| 6,279,963 B1 | | 8/2001 | Hulsebos | |
| 6,302,450 B1 | | 10/2001 | Dole et al. | |
| 6,481,755 B2 | * | 11/2002 | Hulsebos et al. | ............. 285/340 |
| 6,499,771 B1 | | 12/2002 | Snyder et al. | |
| 6,533,331 B2 | * | 3/2003 | Hulsebos et al. | ............. 285/339 |
| 7,255,373 B2 | * | 8/2007 | Pridham | ........................ 285/249 |
| 7,837,238 B2 | * | 11/2010 | Krausz et al. | .................. 285/343 |
| 2002/0185868 A1 | | 12/2002 | Snyder et al. | |

FOREIGN PATENT DOCUMENTS

| | | |
|---|---|---|
| CA | 2341130 | 9/2001 |
| EP | 0974780 | 1/2000 |
| EP | 1138999 | 10/2001 |

* cited by examiner

*Primary Examiner* — David E Bochna
(74) *Attorney, Agent, or Firm* — Jeffrey D. Myers; Samantha A. Updegraff; Peacock Myers, P.C.

(57) ABSTRACT

A coupling device for a tube comprising a coupling piece with an insert end for the tube and a sealing organ which is suitable for realizing a seal around the tube inserted in the coupling piece, whereby the sealing organ comprises a series of elements which together form a ring enclosing the tube, and whereby the elements have been provided with at least one grip ring, extending over at least a part of the circumference of the tube, which at least one grip ring is embodied with inwardly and/or outwardly pressed out first projections and second projections extending away from the surface of the grip ring, whereby the first projections and the second projections are provided with, in the plane of these projections extending first anchor teeth and second anchor teeth.

3 Claims, 4 Drawing Sheets

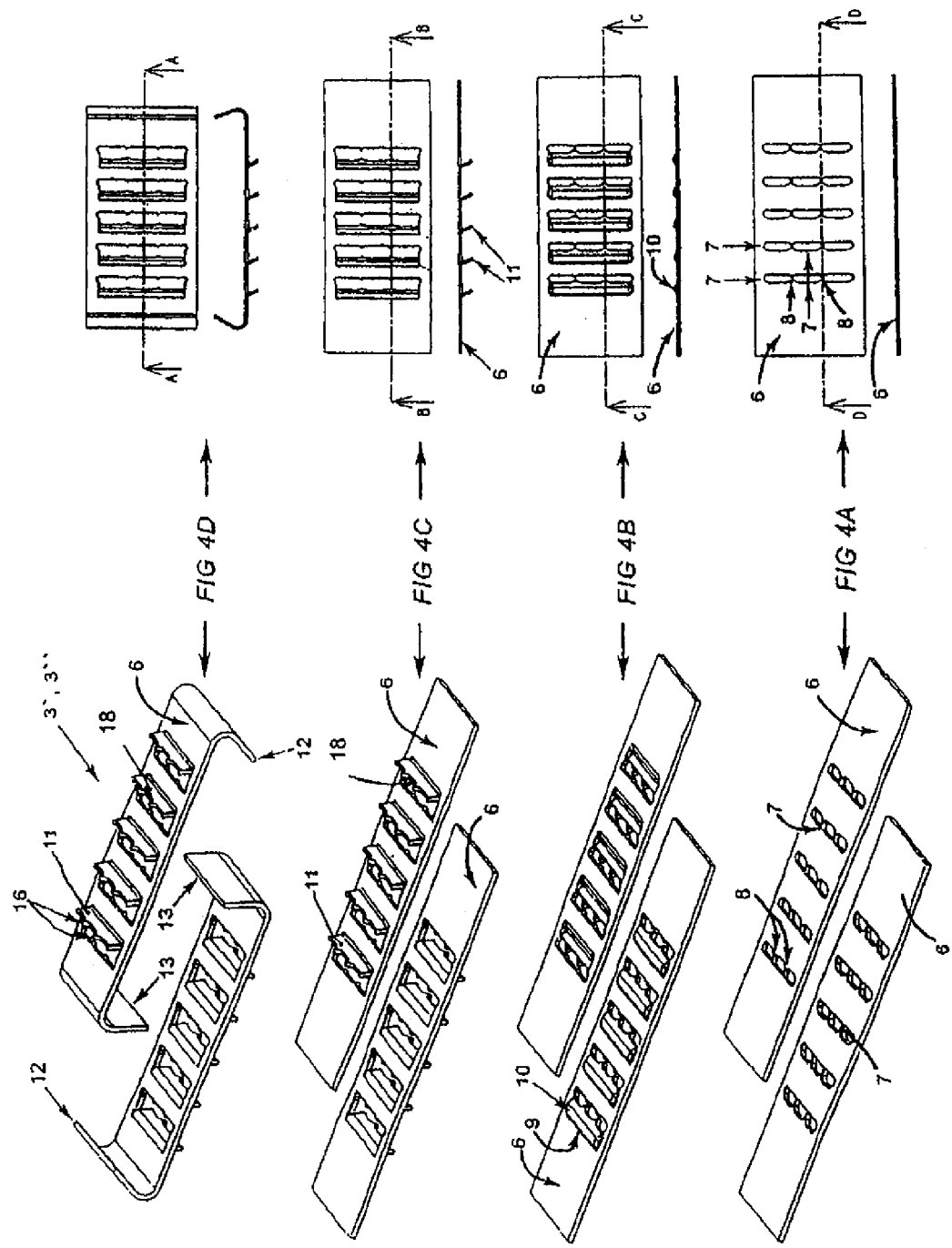

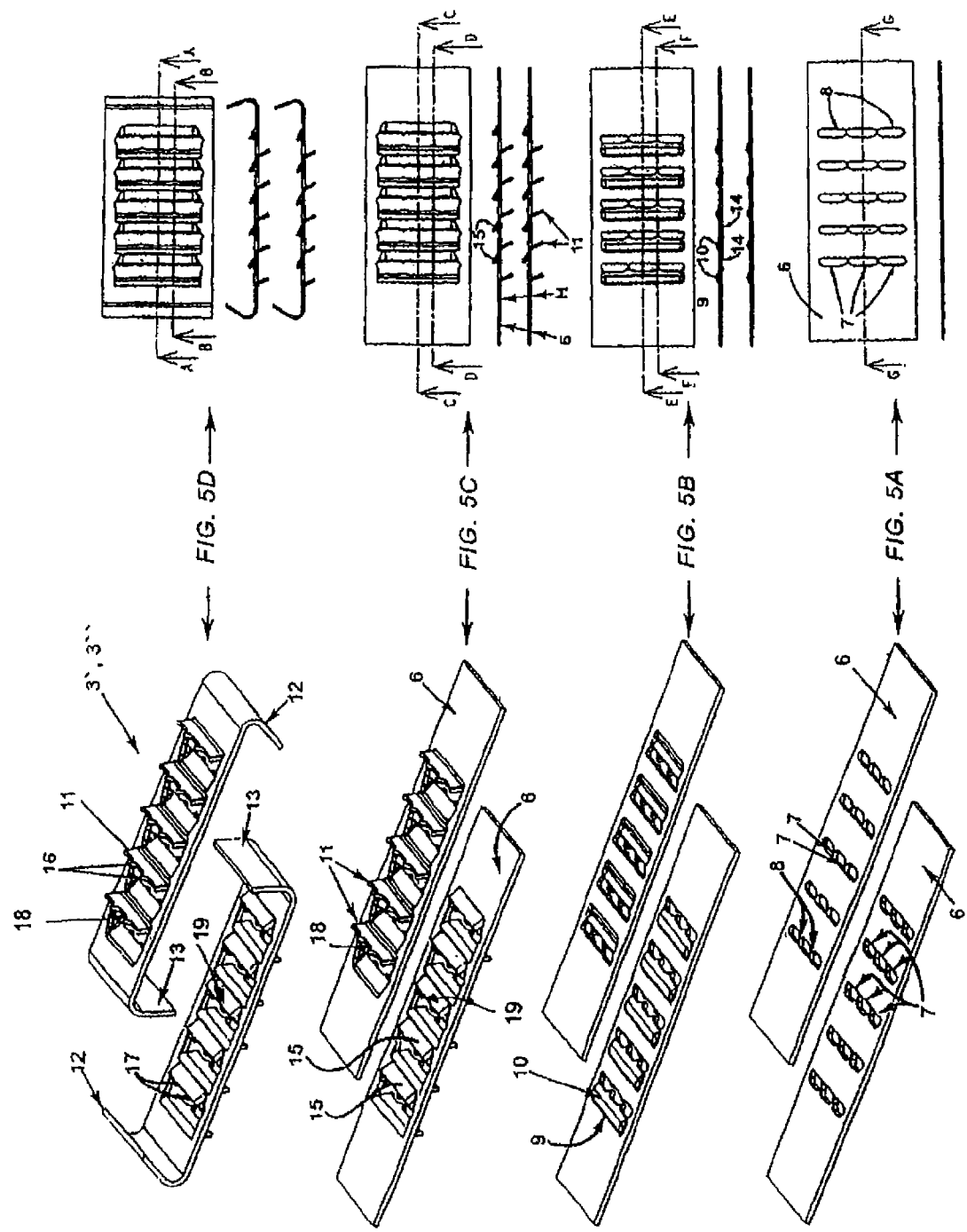

COUPLING DEVICE AND METHOD FOR MANUFACTURING A GRIP RING TO BE USED IN SUCH A COUPLING DEVICE

CROSS-REFERENCE TO RELATED APPLICATIONS

This application is a continuation application of International Patent Cooperation Treaty (PCT) Application Serial No. PCT/NL2009/050338, entitled "Coupling Device and Method for Manufacturing a Gripring to be Used in Such a Coupling Device", to Georg F. Waga N. V., filed on Jun. 15, 2009, which is a continuation application of Netherlands Patent Application Serial No. NL 2001726, to Georg F. Waga N. V., filed on Jun. 26, 2008, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention

The invention relates to a coupling device for a tube comprising a coupling piece with an insert end for the tube and a sealing organ which is suitable for realizing a seal around the tube inserted in the coupling piece, whereby the sealing organ comprises a series of elements which together form a ring enclosing the tube, and whereby the elements have been provided with at least one grip ring, extending over at least a part of the circumference of the tube. Further the invention relates to a method for manufacturing a grip ring for such a coupling device.

2. Description of Related Art

Such a coupling device is known from the European patent application EP-A 0 794 378 of applicant. The known coupling device is applied with tubes of steel, stainless steel, eternite, cast iron, coated steel, PVC, polyethylene and asbestos cement and will be used as connection for one or two of such tubes. On the one hand it is then important that the coupling device provides an adequate sealing and on the other hand that this sealing is capable to resist tension strains. This last function is provided by the grip ring which is part of the known coupling device.

It is known from the Dutch patent application 1009 734 of applicant to embody the grip ring with dents that are pressed out of the surface of the grip ring. The dents border each time at one side on the slit-formed cut-aways that are punched out from the grip ring. A problem of the known grip ring which is part of such a coupling device, is that with the application of the coupling device on tubes which have been manufactured with softer material, the grip ring seems to operate as a cheese slicer, so that the tensile strength of the coupling device according to the known state of the art is relatively limited. When the coupling device according to the state of art is applied with such softer materials as polyethylene, polybutene, acrylbutadienestyrene, or polypropylene, a tensile strength results which for the large diameter-sizes measures approximate 6 to 7 bar, and for the smaller diameter-sizes can be measured at 15 to 16 bar.

It is known from the Dutch patent application 1 014 758 of applicant to embody the grip ring with projections that substantially radially inwardly extend away from the surface of the grip ring. It is proven that the coupling device provided with this grip ring as applied to a tube of relatively soft material with a diameter of 200 mm, tolerates a tension strain of 25 to 30 bar.

From U.S. Pat. No. 6,499,771 a coupling device according to the introduction is known whereby projections pressed out of the surface of the grip ring are applied, which have been provided with anchor teeth extending in the plane of these projections. These known anchor teeth serve to resist axial rotation of the clamped tube.

BRIEF SUMMARY OF THE INVENTION

It is an object of the invention to further improve the coupling device and to provide an alternative embodiment for this grip ring, whereby the grip ring can become available at lower costs.

BRIEF DESCRIPTION OF THE SEVERAL VIEWS OF THE DRAWINGS

The invention will be further elucidated with reference to the drawings.

FIG. 4A-4D shows a number of sequential steps in the manufacturing of a grip ring element according to a first embodiment according to the invention; and FIG. 5A-5D shows a number of sequential steps in the manufacturing of a grip ring element according to a second embodiment according to the invention.

DETAILED DESCRIPTION OF THE INVENTION

Figure 1:
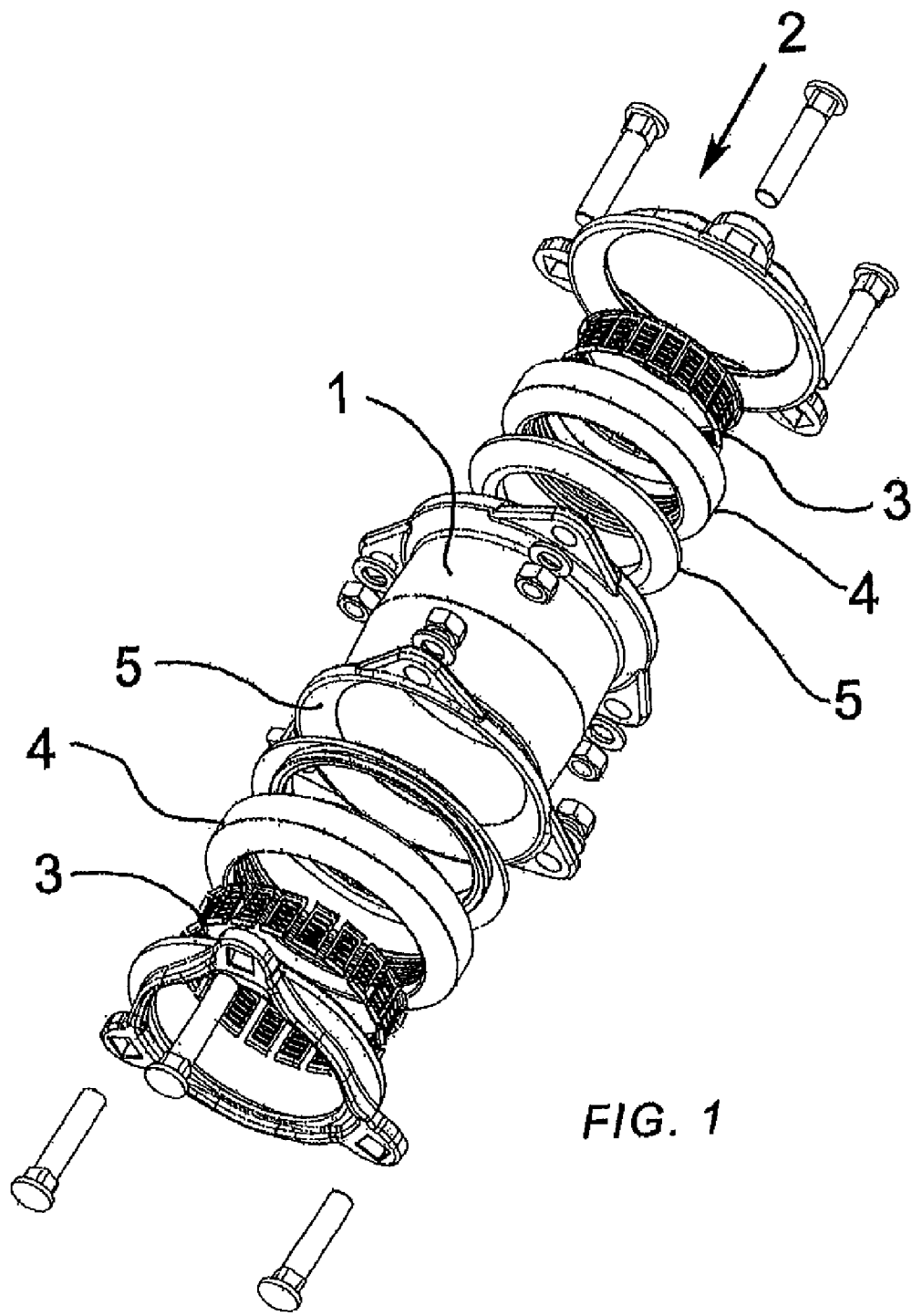
FIG. 1 shows in exploded view the coupling device according to the invention.

The coupling device and the method of manufacturing a grip ring that can be applied therein are to that end characterized by one or more of the appended claims.

The coupling device according to the invention has inwardly and/or outwardly pressed out projections extending away from the surface of grip ring, which are provided with anchor points or anchor teeth that extend in the plane of these projections.

The anchor teeth of the inwardly pressed projections are in particular suitable to engage on a tube of a relatively hard material such as cast iron. With the outwardly pressed out projections a suitable anchoring with the adjacently located part of the coupling device can be provided, i.e., with the pressure elements against which the grip ring abuts in the assembled coupling device.

According to the invention the projections with the anchor teeth are so embodied that between the anchor points or anchor teeth relatively wide flat parts exist. Herewith a suitable anchoring is offered on tubes of softer material such as polyethylene.

The desired quality of the anchor points or anchor teeth provided on the projections is obtained by manufacturing the grip ring elements, which together form the grip ring according to the invention, in a method which is characterized by the following steps:

punching of adjacently located cut-aways in a metal plate such that between the cut-aways relatively thin material-connections remain;

pressing out the metal of the surface of the plate on at least one first side of the adjacently located cutaways until the material-connections have been torn loose;

forcing the pressed out metal back until it is substantially located on the opposite side of the plate and it extends from the plate's plane in the form of a finished first projection.

By deforming the metal as a result of pressing out of the plane of the plate, the material which is located adjacent to the cut-aways is strengthened, while by tearing loose the material connections, anchor points or anchor teeth are obtained which are not only solid but are also provided with a very sharp point with an underneath sided burr which is the result of punching of the cut-aways. The burr is very useful for anchoring in the tube for the benefit of which the grip ring is applied in a coupling device.

In the figures same identical reference numerals refer to similar parts.

Referring now first to FIG. 1, a coupling device in exploded view is shown which comprises a coupling piece 1 with an insert end 2 for a not shown tube, and a sealing organ 3, 4, 5, which is suitable for realizing a seal around the tube inserted in the coupling piece 1. The sealing organ 3, 4, 5, comprises a generally rubber sealing ring 5, and a series of elements which together form a ring 4, whereby the elements 4 embody a grip ring 3 extending over at least a part of the circumference of the tube, and whereby the grip ring 3 is embodied with projections extending away from the plane of the grip ring.

Figures 2, 3:
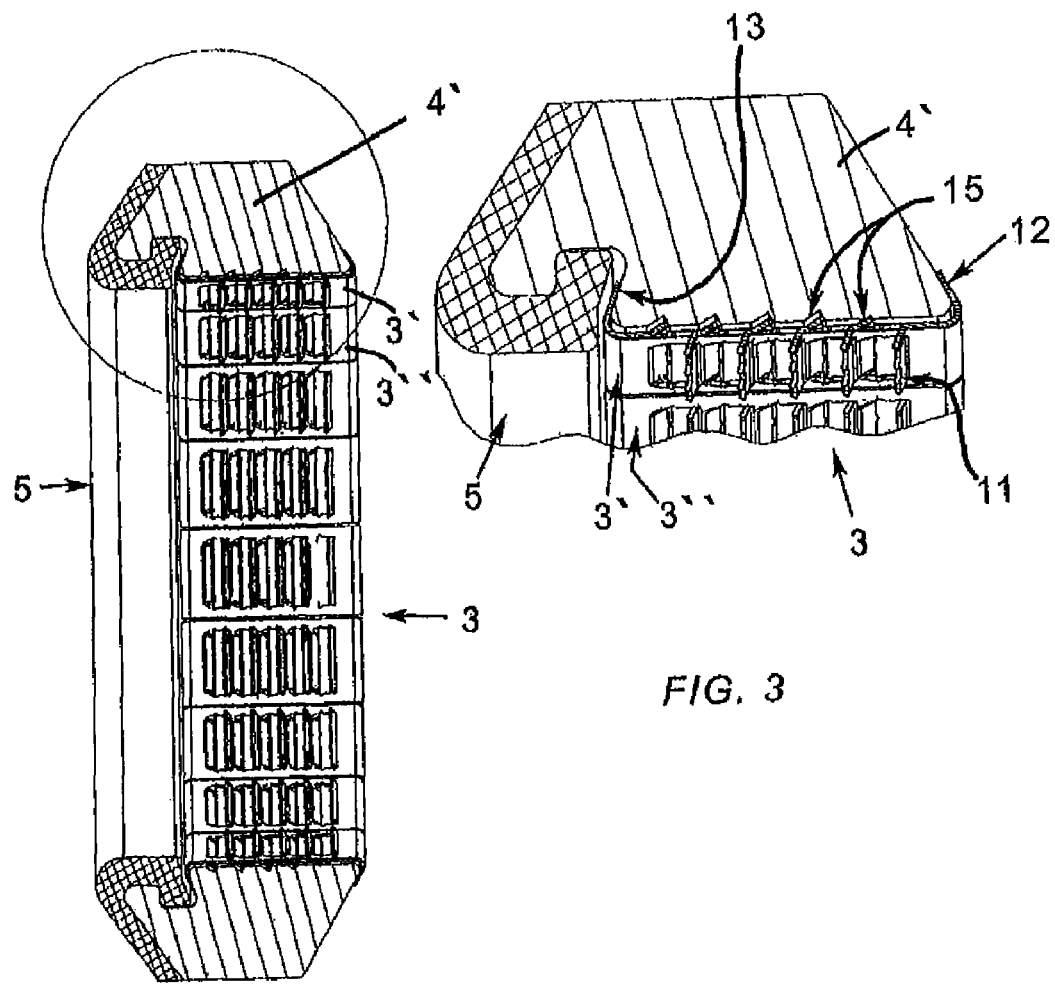
FIG. 2 shows a part of the coupling device according to the invention.
FIG. 3 shows a detail of FIG. 2.

FIG. 2 shows a detail of the coupling device shown in FIG. 1 in exploded view, whereby it is clearly visible that the grip ring 3 is assembled from separate and adjacently positioned grip elements 3',3". In FIG. 3 this is shown in even larger detail.

The grip elements 3', 3" together form a closed ring and have been applied on the inside of one or more pressure elements 4'. Such a pressure element 4' is for example one pressure element of a series of equivalent pressure elements which are mutually adjustable and together form the ring 4. This ring 4 cooperates with the rubber sealing ring 5 for providing a clamping seal on a tube on which the coupling device is applied. For a complete description of the possible embodiment of the coupling device, reference is for instance made to EP-A-0 794 378 and the European application 06812739.8, which applications are deemed to be incorporated by reference herein.

Further referring now to FIGS. 4A-4D and FIGS. 5A-5D each time four process steps are shown, according to which a single grip element 3', 3" according to a first respectively second embodiment is manufactured. To this end the right side of FIGS. 4A-4D and FIGS. 5A-5D each time shows a cross section and a top view, while at the left side each time a perspective view from the bottom side respectively the upper side of the plate 6 is shown which is formed to a finshed grip element 3', 3".

Referring to FIGS. 4A-4D first the manufacturing of a grip element 3', 3" according to a first embodiment will be discussed.

In FIG. 4A it is first shown that the plate 6 is processed by providing this plate with adjacently located cut-aways 7 by means of punching, such that between the cutaways 7 relatively thin material-connections remain.

Further FIG. 4B shows that at a first side 9 of the adjacently located cut-aways 7 the metal of the plate 6 is pressed out of the plane thereof until a bulge 10 is formed and the material-connections 8 have been torn loose.

Further in FIG. 4C it is shown that the pressed out metal 10 is forced back until it is substantially located on the opposite side of the plate 6. This is clearly shown in the cross section on the right side of FIG. 4C, as well as in the perspective view as shown on the left side of FIG. 4C. Here it is shown that the pressed out metal 10 is forced back until it is located in the form of the finished first projection 11.

In FIG. 4D finally it is shown that the extremities 12 and 13 of the plate 6 have been forced, whereby the grip element 3', 3" has been shaped in a form ready for application. The forced ends 12, 13 of the plate 6 have been shown in FIG. 3 and serve to embrace the edges of the pressure part 4' and to be connected therewith.

In FIGS. 5A-5D the method for manufacturing of a grip element 3', 3" is shown according to a second embodiment, which distinguishes from the explained method in FIGS. 4A-4D in the following aspect.

FIG. 5C shows according to FIG. 4C that the pressed out material 10 is forced back until it is substantially located on the opposite side of the plate 6 (indicated with arrow H) and extends from its plane in the form of a finished first projection 11.

Simultaneously with the forming of the first projection 11, it is realised with the variant shown in FIG. 5A-5D, that at a second side 14 opposite to the first side 9 of the adjacent cut-aways 7, a forcing of the metal of the plate 6 occurs until a ready second projection 15 is provided that extends away from the plate 6 in a direction opposite to the direction of the ready first projection 11.

In FIG. 3 it is clearly shown that these second projections 15 can very advantageously mesh in the material of the pressure element 4' so that a very position-accurate coupling between the grip elements 3', 3" and the pressure elements 4' of the pressure ring 4 is obtained. The method for manufacturing the grip elements 3', 3" explained with reference to FIGS. 4A-4D and FIGS. 5A-5D results therein that both the first projections 11 and the second projections 15 are provided with stable anchor points or anchor teeth 16 respectively 17, extending in the plane of the concerning projections 11, 15, which have particularly high material stiffness due to the method of manufacturing the grip elements 3', 3".

The mentioned figures further show that between the anchor points or anchor teeth 16 of the inwardly pressed out projections 11 comparatively wide flat parts 18 are located. Such comparatively wide flat parts are also located between the anchor points or anchor teeth 17 of the outwardly pressed out projections 15, and are indicated with reference numeral 19.

What is claimed is:

1. A coupling device for a tube comprising:
a coupling piece with an insert end for the tube and a sealing organ which is suitable for realizing a seal around the tube inserted in the coupling piece,
wherein the sealing organ comprises a series of elements which together form a ring enclosing the tube, and
wherein the elements have been provided with at least one grip ring, extending over at least a part of the circumference of the tube, which said at least one grip ring is embodied with inwardly and/or outwardly pressed out first projections and second projections extending away from the surface of the grip ring, whereby the first projections and the second projections are provided with, in the plane of these projections extending first anchor teeth and second anchor teeth, wherein between the first anchor teeth and/or between the second anchor teeth, relative to the dimensions of these teeth, comparatively wide flat parts exist, which flat parts form part of said first anchor teeth and/or second anchor teeth.

2. A method for manufacturing a grip element suited for application in the coupling device according to claim 1, wherein the method comprises the following steps:

punching adjacently located cut-aways in a metal plate such that between the cut-aways relatively thin material connections remain;

pressing out the metal of the surface of the plate on at least one first side of the adjacently located cutaways until the material connections have been torn loose; and forcing the pressed out metal back until it is substantially located on the opposite side of the plate and extends from its plane in the form of said first projection.

3. The method according to claim 2, further comprising the step of forcing the metal of the plate at a second side, located opposite to the first side of the adjacently located cut-aways, into said second projection which extends from the plate in an direction opposite to that of the first projection.

* * * * *